(12) United States Patent
Carlson et al.

(10) Patent No.: US 10,352,347 B2
(45) Date of Patent: Jul. 16, 2019

(54) FABRICATED-IN-PLACE INSERTS TO RECEIVE SELF-PIERCING RIVETS

(71) Applicant: GM GLOBAL TECHNOLOGY OPERATIONS LLC, Detroit, MI (US)

(72) Inventors: Blair E. Carlson, Ann Arbor, MI (US); Pei-Chung Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 15/396,925

(22) Filed: Jan. 3, 2017

(65) Prior Publication Data

US 2017/0114815 A1 Apr. 27, 2017

Related U.S. Application Data

(62) Division of application No. 14/189,001, filed on Feb. 25, 2014, now Pat. No. 9,556,892, which is a division of application No. 13/080,845, filed on Apr. 6, 2011, now Pat. No. 8,662,141.

(51) Int. Cl.
| | |
|---|---|
| *F16B 19/08* | (2006.01) |
| *B21J 15/04* | (2006.01) |
| *B22D 19/00* | (2006.01) |
| *B21J 15/02* | (2006.01) |
| *B22D 19/04* | (2006.01) |
| *F16B 5/04* | (2006.01) |
| *B29C 70/76* | (2006.01) |
| *B29C 65/56* | (2006.01) |
| *B29C 65/00* | (2006.01) |

(Continued)

(52) U.S. Cl.
CPC ........... *F16B 19/086* (2013.01); *B21J 15/025* (2013.01); *B22D 19/04* (2013.01); *B29C 65/562* (2013.01); *B29C 66/721* (2013.01); *B29C 70/76* (2013.01); *F16B 5/04* (2013.01); *B29C 65/8253* (2013.01); *B29L 2031/30* (2013.01); *Y10T 29/49835* (2015.01); *Y10T 29/49956* (2015.01); *Y10T 428/12271* (2015.01); *Y10T 428/22* (2015.01)

(58) Field of Classification Search
CPC combination set(s) only.
See application file for complete search history.

(56) References Cited

U.S. PATENT DOCUMENTS

| | | |
|---|---|---|
| 4,313,249 A | 2/1982 | Douthwaite |
| 4,691,754 A | 9/1987 | Trumbauer et al. |
| 5,575,056 A | 11/1996 | Nakagawa |

(Continued)

*Primary Examiner* — Jun S Yoo
(74) *Attorney, Agent, or Firm* — Reising Ethington P.C.

(57) ABSTRACT

One or more ductile metal inserts may be selectively incorporated into articles of limited ductility, including metal castings and molded polymers. The inserts are positioned at joint locations for joining of the article to other articles using self-piercing riveting (SPR). The inserts are of suitable ductility, thickness and strength to receive and retain self-piercing rivets and enable a strong riveted joint between the article and a second article. In an embodiment the articles are magnesium alloy castings formed by any of sand casting, die casting and semi-solid metal casting. The chemical composition of the insert may be informed by the anticipated corrosive environment of the joint and the casting temperature of the magnesium alloy. For magnesium alloy castings which may be exposed to corrosive environments, aluminum alloy inserts are preferred.

14 Claims, 5 Drawing Sheets

(51) Int. Cl.
  *B29C 65/82* (2006.01)
  *B29L 31/30* (2006.01)

(56) References Cited

U.S. PATENT DOCUMENTS

| | | |
|---|---|---|
| 6,739,378 B2 | 5/2004 | Sugita et al. |
| 6,851,742 B1 * | 2/2005 | Kubiak ................ B62D 25/145 |
| | | 296/193.02 |
| 2006/0251495 A1 * | 11/2006 | Opper ........................ F16B 5/04 |
| | | 411/501 |
| 2007/0024090 A1 * | 2/2007 | Vander Sluis ....... B62D 25/145 |
| | | 296/193.01 |
| 2007/0086854 A1 | 4/2007 | Blanton |
| 2013/0340239 A1 | 12/2013 | Ueda |

* cited by examiner

FABRICATED-IN-PLACE INSERTS TO RECEIVE SELF-PIERCING RIVETS

This is a division of application Ser. No. 14/189,001, filed Feb. 25, 2014, and titled, "Fabricated-in-Place Inserts to receive Self-Piercing Rivets" which is a division of application Ser. No. 13/080,845, filed Apr. 6, 2011, titled "Fabricated-in-Place Inserts to receive Self-Piercing Rivets" which issued as U.S. Pat. No. 8,662,141 on Mar. 4, 2014.

TECHNICAL FIELD

This invention pertains to methods of joining castings with limited ductility, particularly, magnesium alloy castings, using self-piercing rivets, through the use of cast-in-place ductile inserts placed in the casting at predetermined joint locations.

BACKGROUND OF THE INVENTION

In automotive body construction there is an increasing trend to use a unitary structure, which may be cast or molded, in preference to an assembled stack of sheet metal components. The cast or molded unitary structure may, if a casting, be a cast iron but is more often of low-density material, aluminum or magnesium which will, in addition to simplifying assembly, enable vehicle mass saving. Molded structures may be polymers, most commonly reinforced polymers. Such a unitary body however must be integrated into and joined with the remainder of the body structure, possibly requiring that a non-ferrous casting of aluminum or magnesium alloy or a molded reinforced polymer be joined to sheet steel or sheet aluminum. Such a joint is typically made using a mechanical fastening process like self-piercing riveting or SPR.

Self-piercing riveting (SPR) is a mechanical joining process for attaching two or more workpieces to one another. Unlike many riveting processes it does not require that holes be predrilled to accommodate the rivet, a feature enabling flexible part fit-up and making it an attractive process for automobile body assembly. A self-piercing rivet is a hollow metal cylinder closed on one end by an integral cap which overhangs the cylinder diameter. The open end of the rivet is driven into a stack of workpieces until the underside of the cap contacts the surface of the stack. The SPR process is typically performed cold, that is, at room temperature or about 25° C., and the stack may comprise two or more workpieces. The total stack thickness is limited to no more than about 12 millimeters or so, and the rivet length is selected so that it fully penetrates all but the last workpiece in the stack which the rivet penetrates only partially. The stack is supported by a shaped die in contact with the last workpiece in the stack. Under the influence of the die and the pressure applied to drive the rivet into the stack, the rivet is upset and the cylindrical walls of the rivet are radially expanded and splayed outward to create mechanical interference between the rivet and the pierced cavity, locking all the workpieces of the stack together.

SPR is commonly used on wrought ductile sheet materials since the piercing action of the rivet during penetration and the upsetting results in significant local deformation of the workpieces. Application of SPR to workpieces of more limited ductility, such as castings or reinforced polymers, and more particularly to magnesium alloy castings, could result in cracking of the workpieces which would reduce the joint strength and the holding power of the rivet.

There is thus a need to adapt the assembly of vehicle incorporating thin, cast metal or molded polymer structural components with reduced ductility to accommodate the SPR process for vehicle assembly.

SUMMARY OF THE INVENTION

Increasingly unitary structural components are being substituted for assemblages of sheet metal fabrications in automobile body construction. The benefits of such a substitution include part elimination as well as the potential for reducing tolerance stackup. The structures may be castings or polymeric structures, typically reinforced polymer structures. The materials used in castings could include cast irons, aluminum alloys and magnesium alloys. But magnesium and magnesium alloy castings are often favored due to their high strength to weight ratio which may result in significant mass reductions. Unitary reinforced polymer structures also offer opportunities for mass reduction. An example of one such structure is the cross-car beam or instrument panel beam. Such a beam may be fabricated as a magnesium casting or as a reinforced polymer.

To be structurally effective such a structure must be robustly attached to other body structural members. If fabricated of reinforced polymer, welding is not suitable. If fabricated of cast magnesium alloy, welding of magnesium to steel is not feasible and welding of magnesium to aluminum promotes the formation of brittle intermetallic compounds which lead to a weak, brittle weld. Hence mechanical fastening methods are employed. It is preferred to use Self-Piercing Riveting (SPR) in which the open end of a self-piercing rivet, a hollow metal cylinder open on one end and closed on its other end by an overhanging, integral cap, is driven into a stack of workpieces and upset or deformed by a die.

SPR is an attractive joining process since it requires minimal joint preparation, for example, no pre-drilled holes are required. Also the SPR process creates no through holes in a workpiece stack for ingress of fluids and the SPR process may develop good joint strength when applied to ductile materials. But because the process requires some deformation of workpiece, the workpieces must exhibit some minimum ductility to ensure that a sound joint is formed. This ductility may be evaluated using a tensile test and it is commonly accepted that workpiece materials appropriate for SPR joints should exhibit a minimum tensile elongation of about 10%. Many cast alloys and reinforced polymer materials exhibit lesser tensile elongations.

Some cast magnesium alloys in common use, such as AZ91 (nominally 9 wt % aluminum, 1 wt % zinc) may have an elongation before fracture of less than 5% as measured in a tensile test, with even the most ductile casting alloys exhibiting elongations to fracture of less than 15%. Hence, it will be challenging to form, at room temperature, a robust SPR joint in at least some cast magnesium alloy structures under the wide range of process conditions which may be encountered in high volume manufacturing.

This invention provides a method of using Self-Piercing Riveting (SPR) to form a robust joint at room temperature, or about 25° C., when assembling a workpiece stack incorporating one or more limited-ductility workpieces. These may include magnesium alloy workpieces containing 85% or more by weight of magnesium or molded or laid-up reinforced polymer workpieces.

A plug or insert of a metal suitable for receiving an SPR rivet and forming a robust joint may be positioned and retained in a magnesium alloy casting or a reinforced polymer. It is intended that such an in insert may be cast-in-place or molded-in-place or other similar process. The term fabricated-in-place is intended to include all of the specific, process- and material-dependent procedures, such as cast-in-place or molded-in-place which may be adopted to securely locate and retain the insert in such a unitary structure. The insert or inserts are pre-positioned in the designed-in joint locations. In forming a joint, the workpieces may be stacked, positioned and secured in any suitable order. The opposing SPR insertion tool and shaped die may then be positioned at the joint location and used to clamp the workpieces in the stack together. Finally the SPR rivet is driven into the workpiece stack and secured within the stack by being upset by the shaped die.

By virtue of such a ductile insert, a limited ductility article, for example a magnesium alloy casting may be SPR riveted as readily as if the entire casting were fabricated of the insert material. Thus no additional precautions or adjustments to conventional SPR practices are required. For example the limited ductility article may be positioned at the top, bottom or middle of the stack.

In an embodiment of the invention, magnesium is cast around a ductile plug or insert, designed so that the solidified magnesium will at least mechanically capture and retain the insert in the finished casting. Preferably, to better retain the insert, the insert will also develop a metallurgical bond to the magnesium casting.

The insert, or inserts, pre-positioned in the joint locations and suitably extensive to accommodate some expected variability in SPR rivet placement, serve(s) to receive the rivet. The use of such a rivet-receiving insert may afford flexibility in workpiece stack-up provided the insert thickness matches the wall thickness of the casting and the insert surfaces are flush with or protrude beyond the wall surfaces of the casting.

The insert which will generally be in the form of sheet or plate with two opposing, generally parallel sides and bounded by a perimeter. The thickness of the insert should substantially equal the thickness of the casting at the insert location so that the opposing surfaces of the insert will be in contact with the opposing surfaces of the mold cavity. This may require that the casting thickness be reduced in the vicinity of the insert.

A wide range of metals and alloys may be used for the insert if no exposure to aqueous electrolytes which could set up a galvanic cell between the insert and the magnesium alloy may occur in service. These metals and alloys could include, for example, iron and its alloys, including carbon and stainless steels, titanium and its alloys, copper and its alloys and aluminum and its alloys. But, aluminum, a common alloying element in magnesium alloys, is a preferred material for the insert since it may develop the desired metallurgical bond and renders the magnesium alloy less susceptible to galvanic corrosion. Specific preferred aluminum alloys may include (Aluminum Association) AA6061, AA6063, AA5052 and AA5056 grades as well as AA1xxx 'pure aluminum' grades, preferably grades with reduced iron content.

The ductile insert may be generally positioned in known and predetermined joint locations in the casting to receive the self piercing rivet. If die casting is used, one or other of the steel die portions may be recessed, shaped or otherwise adapted to hold the insert in position during die filling. In a sand casting a similar practice may be followed or the insert may be associated with a core. The lateral extent of the insert may be chosen to comprehend any vehicle-to-vehicle uncertainty or variability in rivet position. The thickness of the insert may be greater or substantially equal to the thickness of the magnesium in which it is contained, and the insert may be shaped, for example, by stamping, to conform to the general form of the casting in a joint location.

Because the melting points of pure magnesium (650° C.) and of pure aluminum (660° C.) are similar, the choice of cast alloy and insert will be informed in part by the requirement that the aluminum not melt and be dissolved in the magnesium alloy. This requirement may also inform the casting process chosen.

Casting alloys are typically poured, or in the case of high pressure die castings forced under pressure, into the (casting) mold at a temperature greater than the temperature at which they become liquid, their liquidus temperature, to ensure that the alloy remains fluid until the mold is filled. This temperature excess further challenges the choice of a suitable aluminum alloy insert.

Of course, aggressive cooling of the insert may be promoted by the use of chills (in sand casting molds) or strategically-positioned cooling lines (in die casting dies). Since melting of the insert will not occur immediately these strategies may be used to limit the duration of the high temperature exposure experienced by the insert and thereby limit or suppress any melting.

An AA1xxx alloy is a suitable choice for the insert because it has the highest melting point of all commercial aluminum alloys and it is extremely ductile at room temperature and will therefore not crack or fracture during SPR. However, consistent with its high ductility, AA1xxx alloys exhibit lower strengths than may be obtained with more highly alloyed compositions such as the magnesium-silicon alloyed AA6XXX alloys, for example AA6061or the AA5xxx alloys such as AA5052. Where a higher strength joint is required, the thickness of the insert may be increased or a more highly alloyed aluminum alloy may be employed. But the more highly alloyed aluminum alloys will exhibit a lower liquidus temperature and may require an alternative casting process.

Semi-Solid Metal (SSM) casting is a process akin to plastic injection molding in which a semi-solid magnesium alloy is injected into a die at a temperature between its liquidus temperature and solidus temperature. The solidus temperature is nominally the highest temperature at which the alloy is solid ignoring any incipient melting resulting from local segregation. In this temperature range the alloy is semi-solid, containing both liquid and solid.

SSM casting may be practiced when the volume fraction of solids is about 30-60% by volume. Mechanical shearing of the semi-solid alloy generates a flowable, thixotropic structure that allows the alloy to be forced into a die under pressure where it will solidify. Since the SSM process is operated at a lower temperature than a conventional casting process, it affords more flexibility in the choice of aluminum alloy for the insert.

The practice of casting of a ductile insert into a brittle casting is not restricted to magnesium and magnesium alloy castings but may also be applied to aluminum castings, for example aluminum-silicon castings such as A309 or A356, as well as cast irons including grey cast iron or ductile iron.

Also, practices suited for insertion of a ductile insert into a casting are generally suited for insertion of a similar ductile insert into a reinforced polymer article, including laid-up structures, but particularly including, injection-molded components which may be fiber-reinforced. Moldable polymer materials may be rendered flowable at lower temperatures than castings so that any of the possible ductile metals suggested for use with cast alloys may be employed without concern for the effect of the molding temperature on the insert. As with castings, cooling to about room temperature, or about 25° C., will develop the required structural characteristics in the polymer.

Similar design practices may be followed for the insert to achieve good retention of the rivet by the molded component or unitary body. Such inserts will confer advantages in joining reinforced polymer articles to steel or aluminum vehicle body components which are comparable to those obtained in castings.

Other objects and advantages of the invention will be apparent from a description of preferred embodiments which follows in this specification.

DESCRIPTION OF PREFERRED EMBODIMENTS

The following description of the embodiment(s) is merely exemplary in nature and is not intended to limit the invention, its application, or uses.

One strategy to reduce assembly complexity and dimensional variation in vehicle bodies has been to replace welded-together sheet metal assemblies with unitary structures which may be reinforced polymers or castings. If a casting, such a unitary structure may be made of any casting alloy in common use in automotive applications, including any of the variants of cast iron, aluminum alloys and magnesium alloys. Often magnesium alloys are preferred for their attractive strength-to-weight ratios and potential for mass reduction. If a reinforced polymer, the polymer may be any such polymer and reinforcement in common automotive use and employ commonly-used fiber-, woven- or mat-based reinforcements including glass fibers, aramid fibers and carbon fibers.

Figure 1:
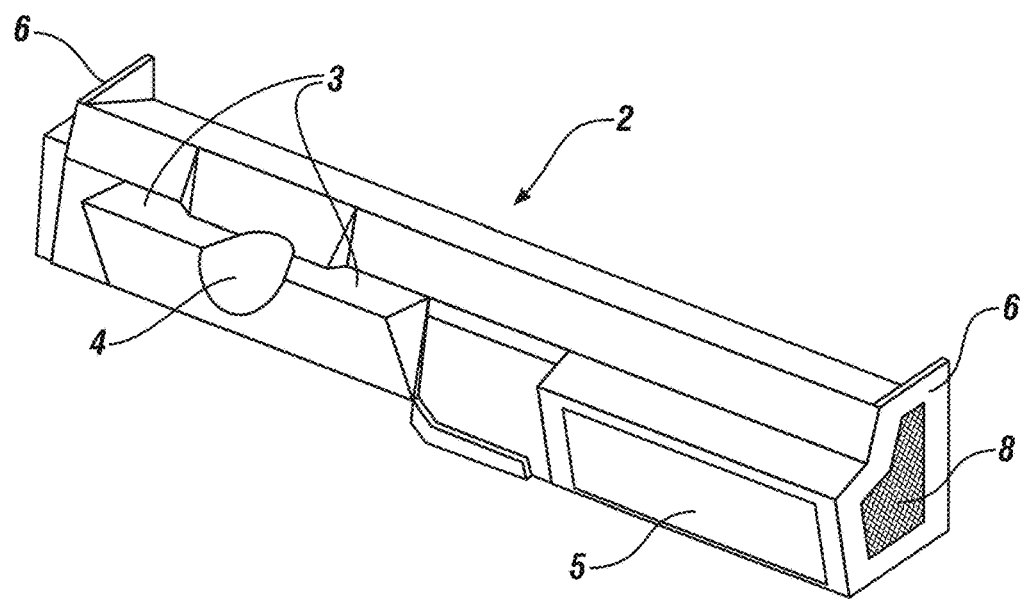
FIG. 1 shows a perspective view of a representative design for a cast magnesium or reinforced polymer cross-car beam illustrating possible locations where SPR rivet-receiving inserts might be cast into the beam.

An example of a design for such a unitary structure, a cross-car beam 2, is shown in FIG. 1. In subsequent discussion it will be assumed that it is a magnesium casting but it could also be molded from a reinforced polymer. Beam 2 incorporates features for support of an instrument panel cluster 3, for passage of a steering column 4, and to accommodate a glove box 5 among other features commonly associated with an automobile instrument panel.

This approach, substitution of a built-up sheet metal assembly with a unitary structure continues to be challenged by the difficulty of assembling these unitary structures into the body, and in particular the challenge of forming a robust, load-carrying joint between the structure and either steel or aluminum. For example, the side flanges 6 of cross-car beam 2 of FIG. 1 must be attached to the vehicle body sides (not shown).

When fabricated as a magnesium casting, welding of the cross-car beam 2 to the body sides is not a feasible approach. Magnesium cannot be welded to steel and magnesium-aluminum welds are brittle with limited load-carrying ability. Among mechanical fastening approaches, Self-Piercing Riveting (SPR) is an attractive joining process since it requires minimal joint preparation, and may develop good joint strength when applied to ductile materials such as the sheet aluminum and steel alloys commonly used in automobile body construction.

Figure 2:
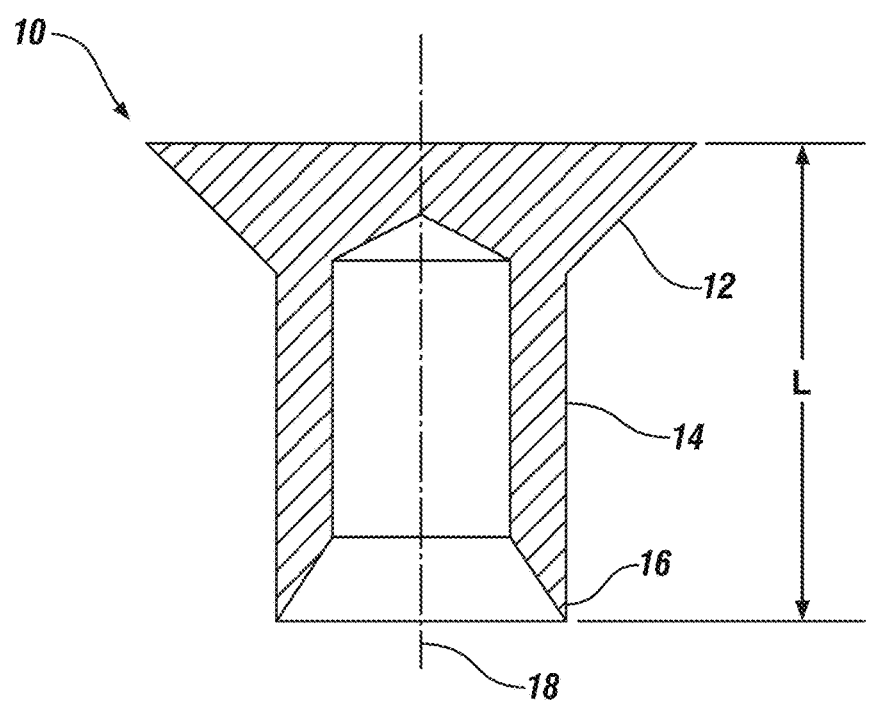
FIG. 2 is an enlarged, schematic illustration of a cross-sectional view of a self piercing rivet.
Figure 3:
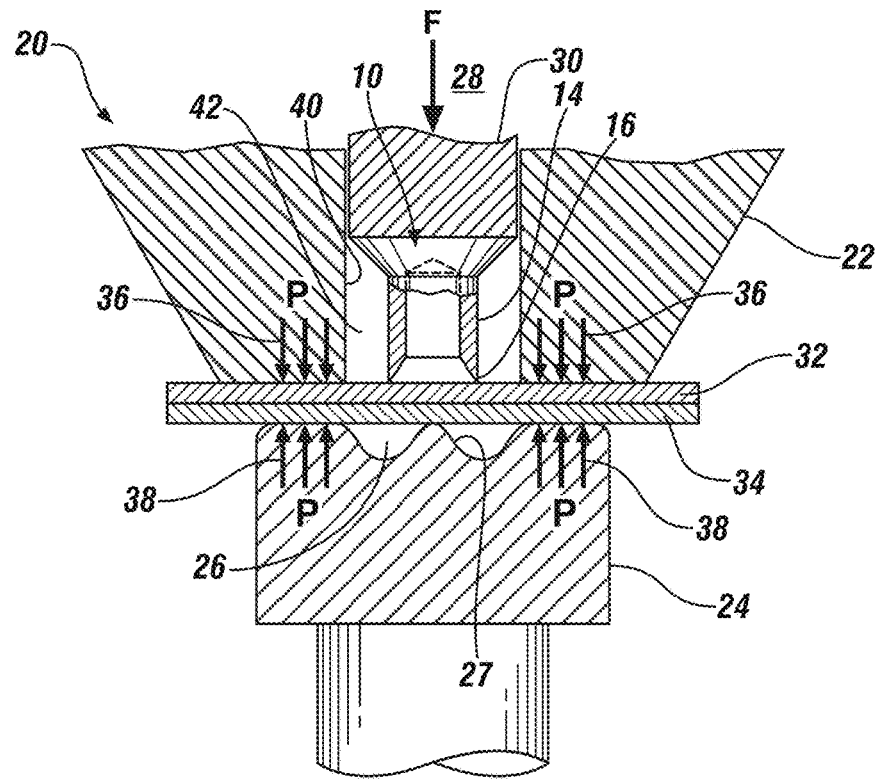
FIG. 3 is a schematic illustration showing a cross-sectional view of a portion of a device for insertion of a self-piercing rivet into a two workpiece stack prior to penetration of the stack by the rivet.
Figure 4:
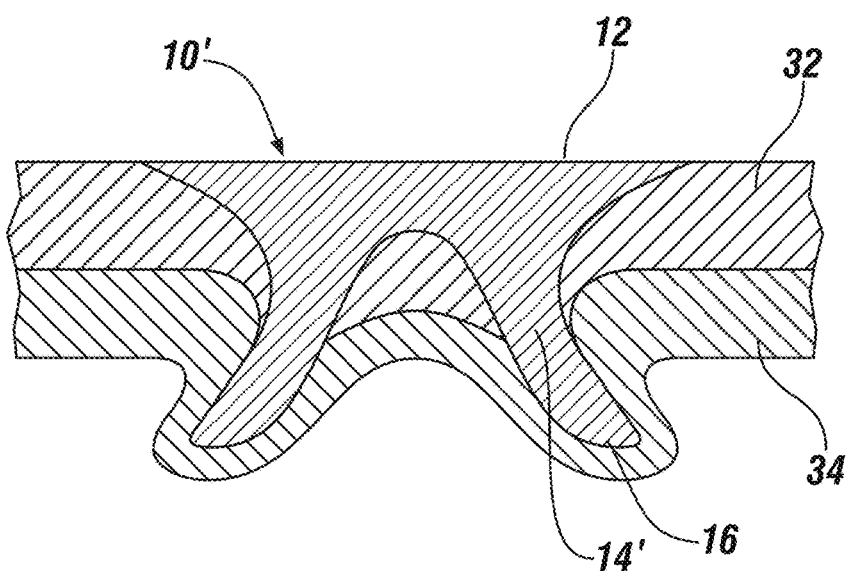
FIG. 4 is a schematic illustration, in cross-sectional view, of a fully inserted self piercing rivet in a two workpiece stack illustrating the deformation of the rivet and the workpieces.

The practice of Self-Piercing Riveting (SPR) may best be understood by reference to FIGS. 2-4. FIG. 2 shows, in cross-section a self-piercing rivet 10 with an annular cylindrical body 14 disposed about centerline 18. At one end 16 of annular cylindrical body 14 the wall is tapered for ease of penetration of a workpiece, while the other end of annular body 14 terminates in a disc-shaped cap 12 whose diameter extends beyond the exterior diameter of annular body 14.

Self-piercing rivet 10 may be used to secure workpieces 32 and 34 as shown in FIG. 3. Opposing pressure P, indicated by opposed arrows 36 and 38, is applied to workpieces 32 and 34 by opposing elements, nose 22 and die 24, of installation tool 20. Rivet 10 is directed into workpiece 32 by the action of punch 30 under application of insertion force F directed in the direction of arrow 28 and guided by the walls 40 of cavity 42 centrally positioned within nose 22. Die 24 has a shaped cavity 26 with a central protrusion 27 generally positioned on centerline 18 (FIG. 2) of rivet 10.

The joint formed by the inserted rivet 10' is shown in FIG. 4. As the rivet 10 is driven downward, the portions of workpieces 32 and 34 lying within the boundary of die cavity 26 are penetrated by the tapered ends 16 of rivet 10. In addition, those portions of workpieces 32 and 34 within the boundary of die cavity 26 will be bodily displaced in the direction of arrow 28 into contact with protrusion 27 of die 24. Protrusion 27 will act to splay the walls of annular body 14. Rivet 10 is chosen to be of such a length L (FIG. 2) that it will only partially penetrate the workpiece, here workpiece 34, in contact with die 24. When the walls of annular body 14 are displaced by protrusion 27 into configuration 14' the workpieces 32 and 34 are restrained by rivet cap 12 and walls 14' to form a robust joint.

Appreciable workpiece deformation results during the making of such a joint. For example, as shown in FIG. 4, die contacting workpiece 34 shows appreciable thinning in the region underlying cap 12 of the rivet, while workpiece 32 is severely bent and thinned in the annular 'overhanging' region between the diameter of disc-like cap 12 and the outer diameter of annular body 14. The ductility of the steels and aluminum alloys commonly used in the fabrication of automobile bodies is adequate to sustain this deformation occurring during SPR riveting without cracking.

However, the room temperature ductility of magnesium alloys is significantly less than that of either steel or aluminum and cracking of the magnesium alloy may occur during room temperature SPR riveting.

Figure 5:
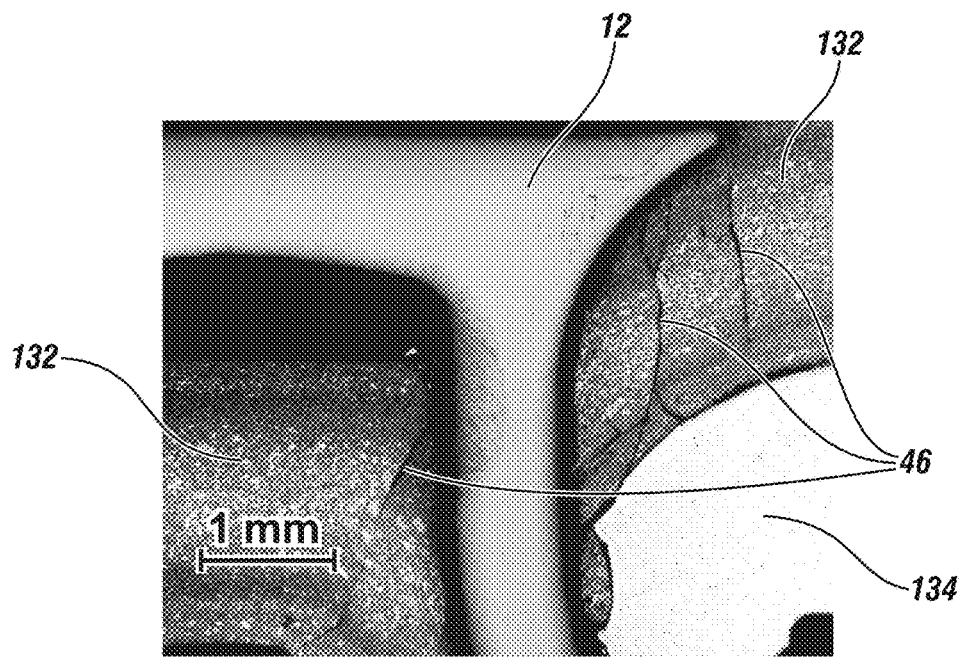
FIG. 5 is an optical micrograph showing, in cross-section, an SPR rivet after insertion into a magnesium workpiece and showing fractures in the magnesium workpiece.

For example, FIG. 5 shows a close-up, sectional view of such an SPR rivet inserted into a workpiece stack comprising a magnesium alloy workpiece 132 overlying an aluminum workpiece 134. Cracks 46 may be observed at several locations in the magnesium alloy workpiece while the more ductile aluminum workpiece shows no signs of cracking. It will be appreciated that the deformation in workpiece layer 34 (FIG. 4) is even more extensive than the deformation undergone by workpiece layer 32 (FIG. 4). Hence the tendency to crack shown by magnesium alloy workpiece 132 would not be mitigated by inverting the stack sequence, that is, by substituting workpiece 132 for 134 and workpiece 134 for 132 in FIG. 5.

For this reason, it is usually recommended that magnesium be heated to about 300° C. to increase its ductility before an SPR joint is made to minimize any tendency for cracks and defects in the magnesium alloy. Heating the magnesium alloy to enhance its ductility is even more important for cast magnesium alloy components, since cast products commonly exhibit less ductility than wrought products.

But such heating of magnesium structures, even local heating of only that portion of the component where SPR is performed, is inconvenient and expensive. The inventors have therefore developed a procedure enabling the use of SPR for joining cast magnesium alloy structures at room temperature.

The inventors have appreciated that an insert of a ductile material, may be incorporated in a cast magnesium alloy article at the location intended to receive an SPR rivet. Now, in the course of the SPR process, the SPR rivet will penetrate, fully or partially, depending on the placement of the insert in the workpiece stack, the ductile insert rather than the magnesium alloy and thereby form a crack-free SPR joint. For example incorporation of such a ductile insert 8 in end flange 6 of the cast magnesium cross-car beam 2 of FIG. 1 will readily enable attachment of the beam to the body sides (not shown).

The requirements for the insert fall into three categories: it must be suited to receive an SPR rivet and form a strong joint; it must be compatible with the magnesium casting during service; and it must be compatible with the casting process used to fabricate the magnesium casting.

In joints which are not exposed to an aqueous electrolyte a wide variety of ductile inserts may be used. These may include, for example, steels and other ferrous alloys, including stainless steels, aluminum alloys, titanium alloys and copper alloys among others. The particular alloy and the thickness of the insert may be selected to develop the desired joint strength. An SPR rivet may fail by fracture, but in most SPR joints joint failure is by pull-out of the rivet. Pull-out requires severely deforming the joint materials and so the greater the strength of the workpieces the greater the pull-out strength when the strength of the workpieces is lower than that of the rivet material. The workpiece strength may be modified through the use of higher strength inserts or by increasing the thickness of the insert. However the thickness of the insert should be selected to assure that the overall joint thickness does not exceed about 12 millimeters or so. The recommended hardness of SPR rivets depends on both the strength and thickness of the workpieces and may be as high as about 500 Vickers hardness or about 1500 MPa tensile strength.

In the presence of an aqueous electrolyte however many of these materials will promote galvanic corrosion in the magnesium alloy and should not be employed. Where exposure to corrosive environments may occur, the insert is preferably an aluminum alloy such as an AA 1xxx, AA5xxx or AA6xxx alloy. Particularly preferred alloys are AA5052, AA5058, AA6061, AA6063 and AA 1xxx alloys with very low iron content. Use of aluminum inserts is also advantageous in securing the insert in the magnesium alloy casting since magnesium alloys with aluminum, enabling formation of a metallurgical bond between them.

Figure 6:
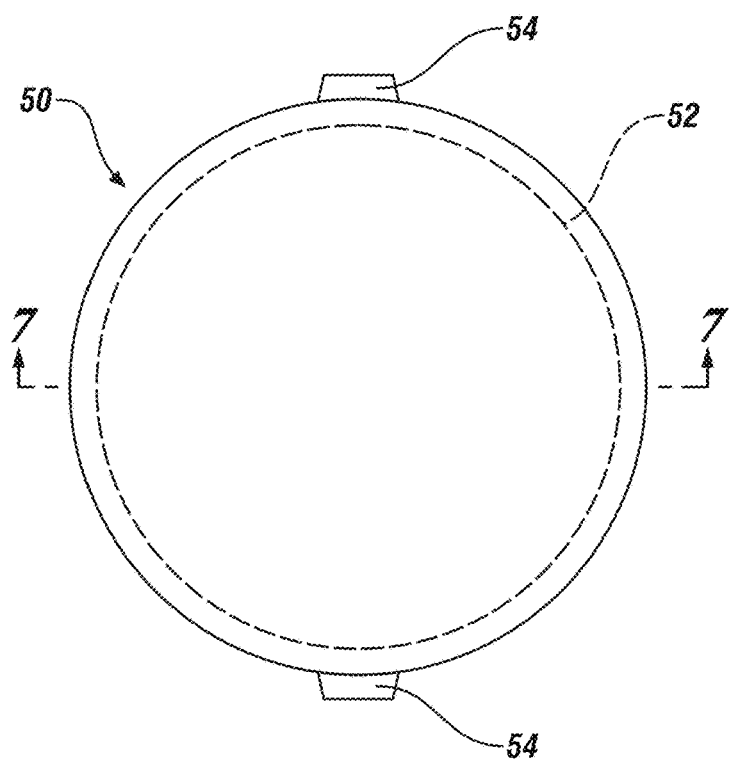
FIG. 6 shows, in plan view, a representative insert geometry.

It is intended that such an insert be cast-in-place. But since the practices to be described may be adapted to molded-in-place inserts in polymer-based structures it may be preferred to characterize the inserts as fabricated-in-place to address inserts in either material system. The insert may be retained in the casting by at least mechanical interference and so may include features which may be filled or infiltrated by the liquid casting metal but which, upon solidification of the casting, will mechanically interfere with the casting to retain the insert in place. An example of such an insert is shown, in plan view, in FIG. 6. The insert 50, is generally disc-shaped with outwardly-extending tabs 54 and a shaped edge with a through-thickness medial groove 52, best seen in FIG. 7. When cast into magnesium casting 56, shown in sectional fragmentary view in FIG. 7, tabs 54 restrain the insert against rotation and groove 52 restrains the insert against pull-out. Of course inserts with many other plan view shapes may be employed and, in inserts of lesser plan view symmetry, such as polygons, tabs 54 may be eliminated as unnecessary. Similarly, features other than groove 52 and tabs 54 may be employed to mechanically restrain insert 50. For example a medial ridge or a combination of grooves and ridges may be employed to restrain against pull-out and slots or notches used to retrain against rotation.

As shown in FIG. 4, the faces of the abutting workpieces must be in contact to form a robust SPR joint so that any insert surface(s) which participate in the SPR joint may not be recessed below the cast surface. At least one of the insert surfaces, here surface face 58, must be at least co-planar with casting surface 62, defined by the surface of mold portion 57. It is acceptable for the insert to protrude beyond the casting surface as shown at insert surface 60 and casting surface 64 defined by the surface of mold portion 61. Such a configuration, enabled by recess 59 in the surface of mold portion 61, also serves to facilitate placement, and temporary retention of insert 50 in the die under the inrush of molten metal. Absent the restraint imposed by the interaction of the insert protrusion and mold recess 59 of die portion 61, insert 50 may move laterally.

Figure 8:
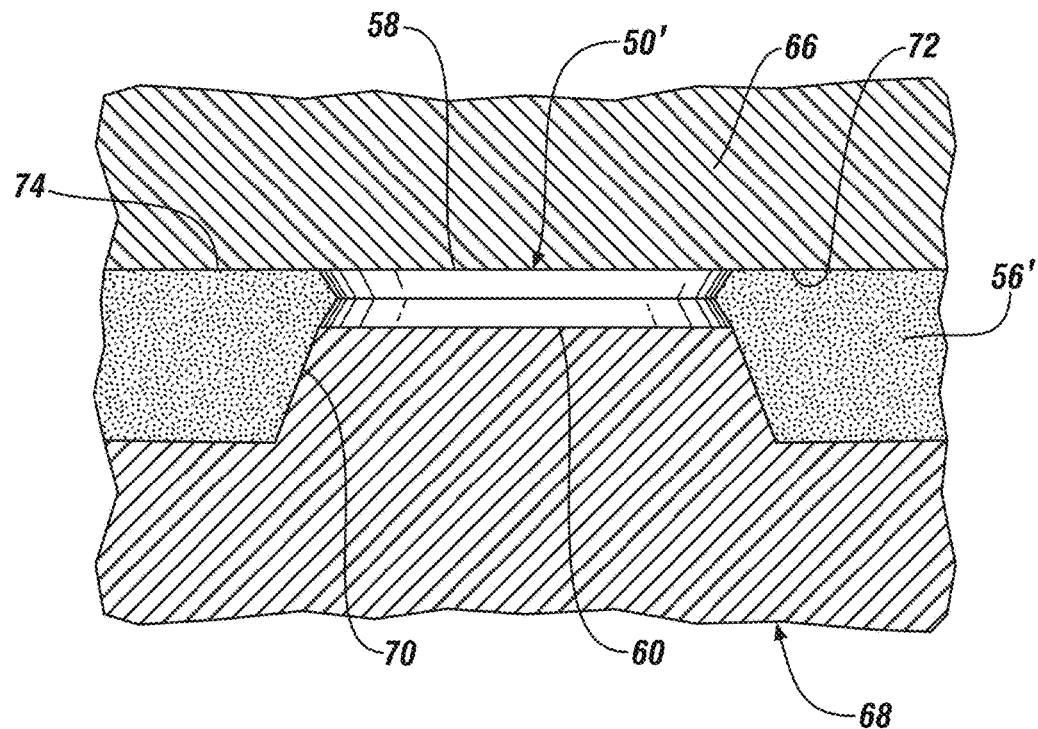
FIG. 8 shows a fragmentary cross-sectional view of an insert similar to that shown in plan view FIG. 6 as cast into a casting where the insert thickness is much less than the and casting wall thickness.

In thick regions of the casting it may not be possible to satisfy the requirement that the workpiece stack not exceed about 12 millimeters if an insert of thickness equal to casting thickness is used. When this situation arises, the local thickness of the casting may be reduced by incorporating a boss, post or projection on one of the facing die surfaces. The insert may then be positioned by placing it on the boss or post. An exemplary design is shown in FIG. 8 in which the surface 58, of insert 50' contacts the underside 72 of upper die 66 so that it is coplanar with a surface 74 of casting 56'(shown in fragmentary view). Surface 60 of insert 50' is supported on boss 70 of lower die 68. Thus, thin insert 50' may be situated in casting 56' with a suitably-positioned cavity for access of either of nose 22 (FIG. 3) or die 24 (FIG. 3). Of course the mechanical restraints shown may be supplemented by a metallurgical bond by use of an insert material which alloys with magnesium.

Figure 7:
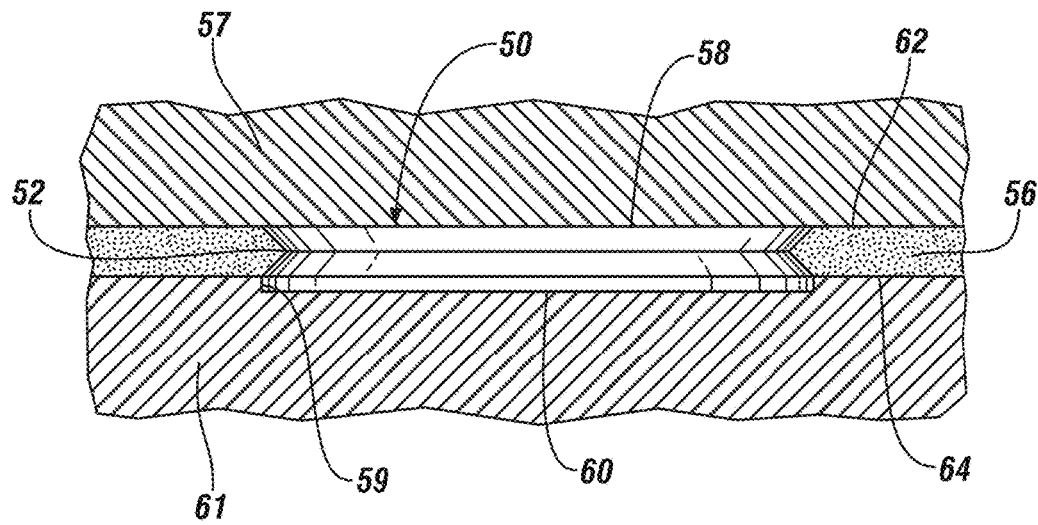
FIG. 7 shows a fragmentary cross-sectional view of the insert of FIG. 6 as cast into a casting where the insert thickness and casting wall thickness are comparable.
Figure 9:
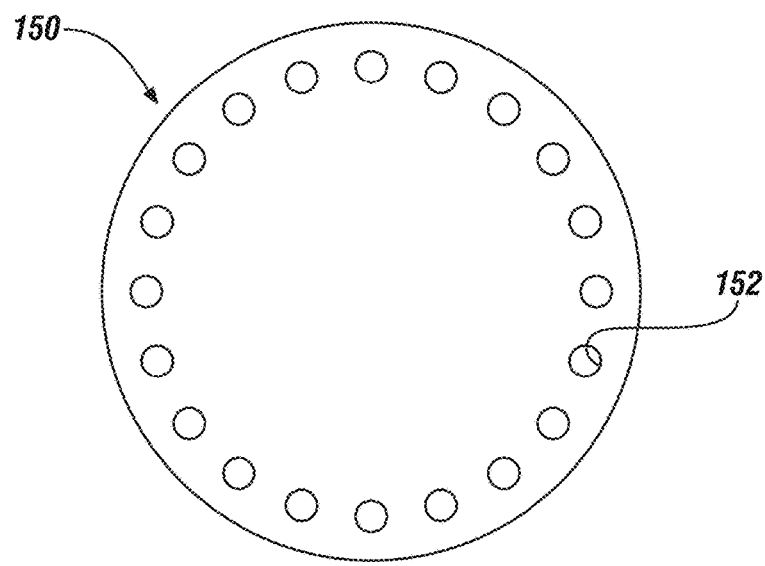
FIG. 9 shows, in plan view, an insert blank.
Figure 10:
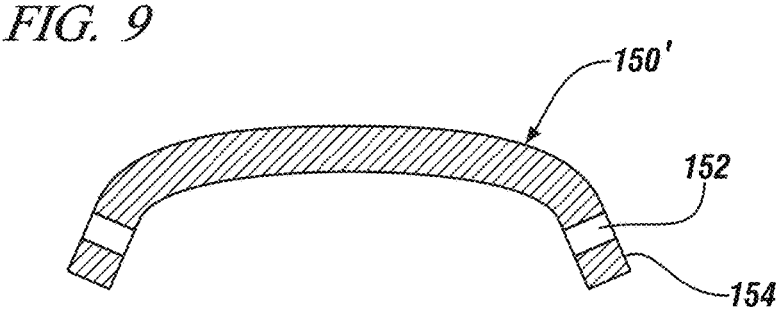
FIG. 10 shows, in sectional view, the insert blank of FIG. 8 after forming into an insert.
Figure 11:
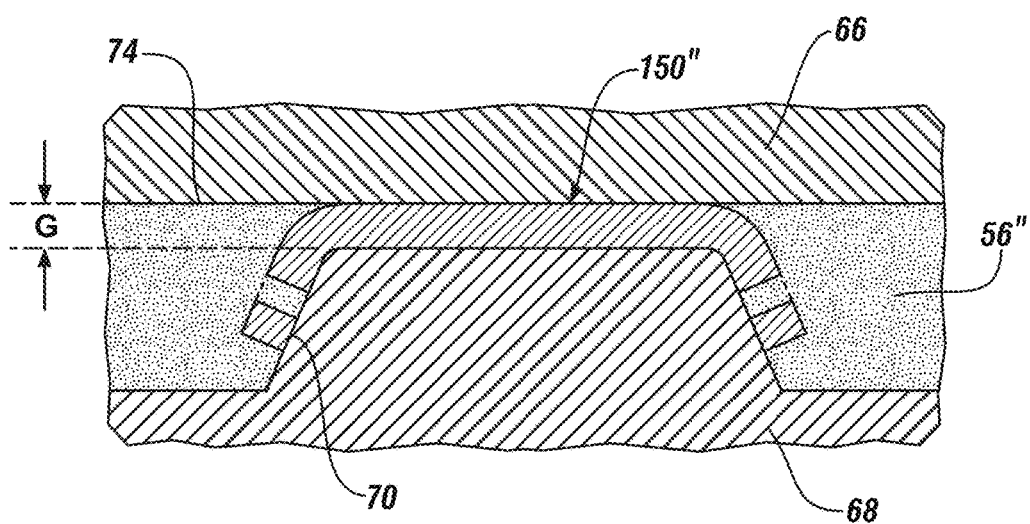
FIG. 11 shows, in fragmentary cross-section, a portion of a casting and its associated die suited for positioning the insert of FIG. 9.

It will be appreciated that insert 50 of FIG. 7 may be employed and robustly secured in the configuration of FIG. 8 by providing a similar recess in one of die portions 66 and (preferably) 68. An alternate means of locating and securing a different inert design is shown in FIG. 11. A stamped circular insert blank 150 with a plurality of (circular) openings 152 is shown in FIG. 9. FIG. 10 shows a sectional view of blank 150 after stamping to create a domed cap 150' with an angled skirt 154 which includes openings 152. Skirt 154 is so angled and dimensioned that that it fits tightly over boss 70. When the mold is closed the interference between skirt 154 and boss 70 will secure and retain the insert in position and the molten metal will infiltrate openings 152 to secure insert 150" in the casting.

The slightly domed or dished interior region of insert 150' (FIG. 9) may be used to accommodate minor tolerance issues. A sheet or plate product of nominal thickness has some allowable thickness variation. Steel casting dies or molds are designed to have minimal compliance, so that an excessively thick insert will interfere with die closure and an excessively thin insert will have an overlying coating of brittle magnesium alloy, which may affect joint quality. By setting the thickness of the insert to be slightly less, say by no more than 3%, of the gap (G) between dies 66 and 68 but slightly doming or dishing the insert, it will flex elastically to bring die surface 74 into contact the insert without inhibiting complete closure of the die portions. Of course, a similar strategy of doming an insert of slightly reduced thickness may be also be followed for inserts 50 (FIG. 7) and 50' (FIG. 8) even though shown as flat in their respective figures.

It is preferred that, as shown in the figures, the insert be located on a generally flat casting surface. However, if necessary the insert may be shaped prior to insertion in the die, for example by stamping, to generally conform to any desired arbitrary surface of the casting where attachment of other workpieces is required.

Three candidate casting processes may be used in fabricating the cast magnesium article. These are: sand casting employing a compacted sand die; die casting using a water-cooled steel die; and semi-solid metal casting, also using a water-cooled steel die. Sand casting and die casting employ liquid alloys, generally superheated to a temperature greater than their liquidus temperature while semi-solid metal casting employs alloys as a flowable liquid-solid mixture at a lower temperature.

High melting point inserts such as steels, titanium alloys and copper alloys are compatible with all three processes. However pure magnesium and pure aluminum have similar melting points: 650° C. for magnesium; and 660° C. for pure aluminum (660° C.), and this may render certain magnesium-aluminum alloy combinations more feasible than others. Generally higher strength alloys are more highly alloyed than lower strength aluminum alloys, and these, more highly alloyed, alloys typically have a lower liquidus temperature than less highly alloyed aluminum alloys.

Pure metals exhibit a melting temperature; below the melting point the metal is solid; above the melting point the metal is liquid. The behavior of alloys is more complex since alloys exhibit a melting range. Above the liquidus temperature the alloy is liquid; below the solidus temperature the alloy is solid; and between the solidus and liquidus temperatures liquid and solid co-exist.

In conventional (liquid) casting processes it is preferred that the magnesium alloy be maintained at a temperature at least equal to its liquidus temperature. As a practical matter, the pouring temperature of the casting alloy, that is, the temperature at which it is poured or injected into the mold, is usually greater than its liquidus temperature. This temperature excess beyond the liquidus temperature, or superheat, helps ensure that the first-poured alloy does not freeze prematurely. The mold has a mold cavity, defined by opposing surfaces, which sets the shape of the finished casting and is fed by an at least one flow channel or runner for introduction of liquid casting metal to the mold cavity. Premature solidification of the inflowing liquid metal will close off the flow channel(s) before the mold cavity is filled and produce a defective part.

It is preferred that the pouring temperature of the magnesium casting alloy be less than the solidus temperature of the insert to ensure that the insert does not dissolve in the liquid magnesium alloy. For thin castings, particularly those fabricated by die casting, the rapid cooling of the cast metal will limit the melting and dissolution of the insert and so, in this case, the liquidus temperatures of the casting alloy and the insert may be comparable, particularly if the insert is as thick, or thicker, than the casting. Some limited dissolution may even be helpful in promoting the development of a metallurgical bond between the casting and the insert to enhance retention of the insert in the casting.

The melting points of pure magnesium (650° C.) and of pure aluminum (660° C.) are similar. But the liquidus temperatures of the magnesium alloys will be reduced below 650° C. due to their alloying additions. So if a commercially pure aluminum alloy is used for the insert this combination may ensure that the insert does not dissolve in the magnesium alloy. For example, the alloying additions in an AZ91 magnesium alloy will reduce its liquidus temperature to about 595° C. with a recommended pouring temperature of between 640° C. and 675° C. An AA 1050 aluminum alloy (99.5 percent by weight aluminum) has a solidus temperature of about 646° C.; and an AA 1100 aluminum alloy (99 percent by weight aluminum) has a solidus temperature of about 643° C. For magnesium alloy AM50, the liquidus temperature is 620° C. with a recommended pouring temperature of from 655° C. to 690° C.

Aluminum alloys with significant alloy addition have lower solidus temperatures which may render them incompatible with some magnesium casting alloys. Consider that, for example, aluminum alloy AA6061 (nominally 1 wt % magnesium and 0.6 wt % silicon) has a solidus temperature of 582° C., appreciably lower than the about 615° C. liquidus temperature of magnesium alloy AM50.

Of course, chills (in sand casting molds) or strategically-positioned cooling lines (in die casting dies) may be used to more rapidly cool the casting, at least in local regions. And, if placed adjacent to the insert, these cooling features may limit the duration of the high temperature exposure experienced by the insert and limit the extent of melting. But it will be appreciated that the composition of the insert must be informed by the thermal properties of the magnesium alloy being cast and that precise control of the casting process is required to ensure that the aluminum insert does not melt and dissolve into the magnesium alloy during the casting process.

An AA1xxx alloy is a suitable choice for the insert because it is extremely ductile at room temperature and will therefore not crack or fracture during SPR. However, consistent with its high ductility, AA1xxx alloys exhibit lower strengths than may be obtained with more highly alloyed compositions such as the magnesium-silicon alloyed AA6XXX alloys, for example AA6061. Where a higher strength joint is required, the thickness of the insert may be increased. If, due to limitations on joint thickness, the insert thickness may not be increased then a more highly alloyed aluminum alloy may be employed. If a more highly-alloyed, lower melting point aluminum alloy is used, an alternative casting process, such as semi-solid metal casting may be employed.

Semi-Solid Metal (SSM) casting is a process akin to plastic injection molding in which a semi-solid magnesium alloy is injected into a die at a temperature between its liquidus temperature and solidus temperature. The solidus temperature is nominally the highest temperature at which the alloy is solid ignoring any incipient melting resulting from local segregation. In this temperature range the alloy is semi-solid, containing both liquid and solid.

SSM casting may be practiced when the volume fraction of solids is about 30-50% by volume. Mechanical shearing of the semi-solid alloy generates a flowable, thixotropic structure that allows the alloy to be forced into a die under pressure where it will solidify. Of course, this is the acceptable solid volume fraction at the furthest extent of the flow front. So, the solid volume fraction of the semi-solid charge entering the mold must be appreciably less, say 10% or so, to accommodate the cooling as the charge progresses into the mold. Since the SSM process is operated at a lower temperature than a conventional casting process, it affords more flexibility in the choice of aluminum alloy for the insert. Suitable magnesium alloys for thixomolding include alloys AZ91 and AM50. A suitable SSM temperature for AM50 may be between about 614° C. and 620° C. compatible with the use of an AA6061 insert.

The compatibility of various cast magnesium alloys and possible aluminum insert alloys is indicated in Table 1. For each of the magnesium alloys the preferred pouring temperature range is listed—for example for an AZ91 alloy it ranges from 640° C. to 675° C. For the aluminum alloys the solidus and liquidus are listed as (solidus/liquidus) so that for the AA 1050 alloy the solidus is 646° C. and the liquidus is 657° C. Magnesium alloy—aluminum alloy combinations for which at least a portion of the (magnesium alloy) pouring temperature range is less than or comparable to the liquidus temperature range of the aluminum alloy are indicated by the symbol "?". These combinations may be feasible even in the absence of aggressive cooling strategies intended to minimize the time the aluminum alloy is exposed to these elevated pouring temperatures. Combinations where the (magnesium alloy) pouring temperature ranges are greater than the liquidus temperature range of the aluminum alloy is indicated by the symbol "x". These combinations may be feasible but will require aggressive cooling.

The compatibility of various semi-solid metal cast magnesium alloys and possible aluminum insert alloys is indicated in Table 2. For each of the magnesium alloys the SSM temperature range is listed—for example for an AZ91 alloy it ranges from 590° C. to 600° C. As in Table 1 the solidus and liquidus are listed as (solidus/liquidus) for the aluminum alloys. Magnesium alloy—aluminum alloy combinations for which the (magnesium alloy) SSM temperature range, as introduced into the die, is less than the solidus temperature of the aluminum alloy are indicated by the symbol "✓". Magnesium alloy—aluminum alloy combinations for which the (magnesium alloy) SSM temperature range, as introduced into the die, is greater than the solidus temperature of the aluminum alloy are indicated by the symbol "x". Of course, inserts distanced from the die runner entry will encounter the semi-solid alloy after some cooling of the charge has occurred and the charge may be less than the insert solidus temperature.

TABLE 1

| | | Pouring | Aluminum Alloys | | | | | |
|---|---|---|---|---|---|---|---|---|
| | | Temp. Range | 1050 (646/657) | 1100 (643/657) | 5052 (607/649) | 5056 (568/638) | 6061 (582/651) | 6063 (616/654) |
| Magnesium alloys | AZ91 | 640-675 | ? | ? | ? | x | ? | ? |
| | AM50 | 655-690 | ? | ? | ? | x | x | x |
| | AM60 | 650-680 | ? | ? | ? | x | ? | ? |

TABLE 2

| | | | Aluminum Alloys | | | | | |
|---|---|---|---|---|---|---|---|---|
| | | SSM Temp. Range | 1050 (646/657) | 1100 (643/657) | 5052 (607/649) | 5056 (568/638) | 6061 (582/651) | 6063 (616/654) |
| Magnesium alloys | AZ91 | 590-600 | ✓ | ✓ | ✓ | ✓ | x | ✓ |
| | AM50 | 610-620 | ✓ | ✓ | x | x | x | x |
| | AM60 | 605-615 | ✓ | ✓ | x | x | x | ✓ |

Those skilled in the art will appreciate that although the invention has been described in the context of magnesium alloy castings, such description is exemplary and not limiting. It is recognized that the practices of the invention are applicable to other cast materials, both ferrous and non-ferrous. For example, some cast aluminum alloys, such as those alloyed with 5% by weight or more of silicon like A356 (6.5-7.5% by weight of silicon) or A319 (5.5-6.5% by weight of silicon) exhibit very limited ductility and would not be suited for SPR joining as cast. But, incorporating a ductile insert in such a casting following the practices just described would enable their participation in an SPR joining process. Likewise the process is readily adapted to cast iron castings which may be fabricated of white iron, grey iron, compacted graphite iron or ductile iron.

Also, the molding process which may be employed in fabrication of polymer and reinforced polymer structures are similar to those employed in casting, particularly die casting or semi-solid metal casting. So the practices and procedures described may readily be adapted to incorporate molded-in-place, or, more generally, fabricated-in-place ductile inserts into reduced ductility polymer and reinforced polymer molded structures and unitary bodies.

The insert materials already discussed may also be employed in reinforced polymer unitary structures. However, other candidate materials may also be considered since galvanic corrosion problems will not inform the choice of insert materials in a reinforced polymer composite.

While preferred embodiments of the invention have been described and illustrated, these are not intended to limit the scope of the invention.

The invention claimed is:

1. An article with opposed surfaces and adapted for attachment to at least a second article using a self-piercing rivet with an annular cylindrical body, the article comprising a cast metal or reinforced molded polymer material of limited ductility, the cast metal or reinforced polymer material being susceptible to damage when penetrated by the self-piercing rivet, the article further comprising;
   one or more joining locations, each consisting of a cast-in-place, or molded-in-place, metal insert, each insert having a thickness defined by opposing exposed surfaces, the insert surfaces being portions of the opposed article surfaces, each insert being adapted for receiving the cylindrical body of the self-piercing rivet and having an edge or boundary region with engageable features to enable secure, interlocked engagement of the insert with the article, so that the article may be secured to the second article by bringing a predetermined joining region of the second article into face to face contact with a selected insert and joining the selected insert to the second article at the predetermined joining region using one or more self-piercing rivets; and
   each metal insert having sufficient ductility to enable penetration and expansion of the one or more self-piercing rivets without damage to the insert.

2. The article of claim 1 in which the engageable features of the insert are one or more of the group consisting of protrusions, grooves and openings which receive molten metal or flowable polymer during casting or molding of the article to subsequently engage the insert with the cast metal or reinforced molded polymer of the article.

3. The article of claim 1 in which the insert is fabricated of sheet metal and at least one of the opposing surfaces of the sheet metal insert is coplanar with the article surface abutting the joining location.

4. The article of claim 3 in which at least a portion of one of the opposing surfaces of the sheet metal insert protrudes beyond the article surface abutting the joining location to facilitate face to face contact between the insert and the joining region of the second article.

5. The article of claim 1 in which the article is a cast magnesium alloy.

6. The article of claim 5 in which the cast magnesium alloy is selected from the group consisting of AZ91, AM60 and AM50.

7. The cast article of claim 1 in which the metal insert forms a metallurgical bond with the article.

8. The cast magnesium article of claim 6 in which the insert is one of the group consisting of aluminum alloys AA1050, AA1100, AA5052, AA5056, AA6061 and AA6063.

9. An article of manufacture comprising two workpieces, each workpiece having opposing surfaces, the two workpieces being assembled and robustly secured to one another using one or more self-piercing rivets at one or more joining locations, one of the workpieces being a cast metal or reinforced molded polymer material of limited ductility comprising, at the one or more joining locations, an extensive metal insert with opposing surfaces adapted to receive the one or more self-piercing rivets, the extensive metal insert having a surface that is coplanar with the surface of the workpiece abutting the joining location.

10. The article of manufacture of claim 9 in which the workpiece of a material of limited ductility is formed of one of the group consisting of a polymer workpiece, a reinforced polymer workpiece, a cast magnesium alloy workpiece, a cast aluminum alloy workpiece, a sheet aluminum workpiece and a sheet steel workpiece.

11. The article of manufacture of claim 9 in which the two workpieces are arranged in mutually-abutting relation such that the location of the joining region of the other than insert-containing cast metal or reinforced polymer workpieces at least partially encompasses the extent of the insert(s) of the insert-containing cast metal or reinforced polymer workpiece.

12. The article of manufacture of claim 9 in which the insert-containing workpiece is a cast magnesium alloy.

13. The article of manufacture of claim 12 in which the cast magnesium alloy is one of AZ91, AM60 and AM50 and the insert is one of the group consisting of aluminum alloys AA1050, AA1100, AA5052, AA5056, AA6061 and AA6063.

14. The article of manufacture of claim 13 in which the insert-containing workpiece is a cross-car beam.

* * * * *